United States Patent
Eshan et al.

(10) Patent No.: US 9,112,691 B2
(45) Date of Patent: Aug. 18, 2015

(54) METHODS AND SYSTEMS FOR DOWNLINK FLOW CONTROL IN A WIRELESS COMMUNICATION SYSTEM

(75) Inventors: Navid Eshan, San Diego, CA (US); Thomas Klingenbrunn, San Diego, CA (US); Shailesh Maheshwari, San Diego, CA (US); Gang Andy Xiao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 188 days.

(21) Appl. No.: 13/208,203

(22) Filed: Aug. 11, 2011

(65) Prior Publication Data

US 2012/0039176 A1 Feb. 16, 2012

Related U.S. Application Data

(60) Provisional application No. 61/373,496, filed on Aug. 13, 2010.

(51) Int. Cl.
*H04L 1/18* (2006.01)
*H04L 1/00* (2006.01)
(Continued)

(52) U.S. Cl.
CPC ............ *H04L 1/1835* (2013.01); *H04L 1/0002* (2013.01); *H04L 1/0026* (2013.01); *H04L 1/0032* (2013.01); *H04L 1/0036* (2013.01); *H04L 1/1607* (2013.01);
(Continued)

(58) Field of Classification Search
None
See application file for complete search history.

(56) References Cited

U.S. PATENT DOCUMENTS 6,996,062 B1    2/2006  Freed et al.
7,286,483 B2 * 10/2007 Connor .......................... 370/252
(Continued)

FOREIGN PATENT DOCUMENTS

EP    1833211 A2    9/2007
EP    1868327 A2   12/2007
(Continued)

OTHER PUBLICATIONS

B. Braden, et al., "Recommendations on Queue Management and Congestion Avoidance in the Internet", Apr. 1998, The Internet Society, RFC 2309.*

(Continued)

*Primary Examiner* — Dang Ton
*Assistant Examiner* — Ronald h Davis
(74) *Attorney, Agent, or Firm* — Patterson & Sheridan, L.L.P.

(57) ABSTRACT

Methods and apparatus for downlink rate control by a user equipment (UE) (e.g., when an overload condition happens at the UE) are provided. For example, the UE may experience CPU overload, CPU near-overload, memory overload, memory near-overload, overheating or near-overheating. For certain aspects, the UE may simulate a "degraded channel" in order to cause an eNodeB to lower a transmission rate or block-size as it would in response to receiving an indication of bad channel conditions. The UE may simulate a degraded channel by modifying a channel quality indicator (CQI) and transmitting negative acknowledgment (NACK) messages to the eNodeB. Therefore, the eNodeB may be responsible for guaranteeing quality of service (QoS) based on the new degraded channel condition. In other aspects, UE downlink flow control is achieved by dropping hybrid automatic repeat request (HARM) packets or reducing a radio link control (RLC) receive window size when an overload condition occurs.

14 Claims, 12 Drawing Sheets

(51) Int. Cl.
*H04L 1/16* (2006.01)
*H04L 12/801* (2013.01)
*H04W 72/12* (2009.01)

(52) U.S. Cl.
CPC ............ *H04L 1/1832* (2013.01); *H04L 47/10* (2013.01); *H04L 47/14* (2013.01); *H04W 72/1252* (2013.01); *H04W 72/1284* (2013.01)

(56) References Cited

U.S. PATENT DOCUMENTS

| | | | |
|---|---|---|---|
| 7,349,337 | B1 | 3/2008 | Mahdavi |
| 7,539,207 | B2 | 5/2009 | Frederiksen et al. |
| 8,175,030 | B2 * | 5/2012 | Terry et al. .................... 370/328 |
| 2004/0047331 | A1 * | 3/2004 | Jang ............... 370/346 |
| 2004/0203973 | A1 * | 10/2004 | Khan ............................ 455/517 |
| 2007/0171830 | A1 * | 7/2007 | Vulkan et al. ................. 370/235 |
| 2007/0223526 | A1 * | 9/2007 | Jiang ............................ 370/468 |
| 2007/0248118 | A1 * | 10/2007 | Bishara et al. ................. 370/469 |
| 2007/0275665 | A1 * | 11/2007 | Molnar et al. ............. 455/67.13 |
| 2008/0117843 | A1 | 5/2008 | Ishii et al. |
| 2008/0130711 | A1 * | 6/2008 | Catreux-Erceg et al. ..... 375/130 |
| 2009/0161545 | A1 | 6/2009 | Ho et al. |
| 2009/0215442 | A1 | 8/2009 | Lindoff et al. |
| 2009/0245223 | A1 | 10/2009 | Godfrey |
| 2010/0037112 | A1 * | 2/2010 | Graumann .................... 714/748 |
| 2010/0157797 | A1 * | 6/2010 | Dinescu .................... 370/230.1 |
| 2011/0044186 | A1 | 2/2011 | Jung et al. |
| 2011/0087944 | A1 * | 4/2011 | Li et al. .......................... 714/748 |
| 2011/0145672 | A1 * | 6/2011 | Jongren et al. ................. 714/748 |
| 2012/0140634 | A1 * | 6/2012 | Thierion ...................... 370/236 |

FOREIGN PATENT DOCUMENTS

| | | | |
|---|---|---|---|
| WO | WO2009058078 | A1 | 5/2009 |
| WO | 2009/106490 | A1 | 9/2009 |
| WO | WO2010100140 | A1 | 9/2010 |

OTHER PUBLICATIONS

PCT Invitation to Pay Additional Fees and, where applicable, Protest Fee, dated Dec. 1, 2011. International Application No. PCT/US2011/047653.

"Adding Extra Hysteresis to Comparators", Maxim Integrated Products Sep. 19, 2005, pp. 1-9, XP002670309, Retrieved from the Internet: URL:http://www.maxim-ic.com/app-notes/index.mvp/id/3616 [retrieved on Feb. 22, 2012].

International Search Report and Written Opinion—PCT/US2011/047653—ISA/EPO—Mar. 9, 2012.

Marc Emmelmann et al: "Empirical Evaluation of Overlap Requirements of Adjacent Radio Cells for Zero Delay Handover", Vehicular Technology.

Nadas et al., "Providing Congestion Control in the Iub Transport Network for HSDPA," Global Telecommunications Conference 2007, Ericsson Research, GLOBECOM '07, IEEE, Nov. 26-30, 2007, 5 pages.

Philipp Svoboda et al: "Bottleneck Footprints in TCP over Mobile Internet Accesses", IEEE Communications Letters, IEEE Service Center, Piscataway, NJ, US, vol. 11, No. 11, Nov. 1, 2007, pp. 839-841, XP011196967, ISSN: 1089-7798, DOI: 10.1109/LCOMM.2007.070559.

Arnab Das, et al.,"Design and Performance of Downlink Shared Control Channel for HSDPA," Person, Indoor and Mobile Radio Communications (Sep. 2002). The 13th IEEE International Symposium on pp. 1088-1091, vol. 3.

* cited by examiner

METHODS AND SYSTEMS FOR DOWNLINK FLOW CONTROL IN A WIRELESS COMMUNICATION SYSTEM

CLAIM OF PRIORITY UNDER 35 U.S.C. §119

The present application for patent claims priority to U.S. Provisional Application No. 61/373,496, entitled, "Downlink Flow Control in a Wireless Communication System," filed Aug. 13, 2010, and assigned to the assignee hereof, which is hereby expressly incorporated by reference herein.

TECHNICAL FIELD

Aspects of the present disclosure generally relate to wireless communication systems, and more particularly to controlling the rate of downlink communications by a user equipment in a wireless communication system.

BACKGROUND

Wireless communication networks are widely deployed to provide various communication services such as voice, video, packet data, messaging, broadcast, and the like. These wireless networks may be multiple-access networks capable of supporting multiple users by sharing the available network resources. Such multiple access networks support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or base stations that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grow with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

Certain aspects of the present disclosure present a method for wireless communication. The method generally includes receiving a packet from an apparatus through a channel, determining an advertised channel quality indicator (CQI) value indicating information regarding a degraded channel when an overload condition happens, wherein the advertised CQI value is determined based on at least one of an actual CQI of the channel, a target flow rate or channel bandwidth, determining a modified acknowledgment message based at least on the advertised CQI and an actual acknowledgment message, wherein the actual acknowledgment message indicates whether or not the packet is received correctly, and transmitting the advertised CQI and the modified acknowledgment message to the apparatus to adjust flow rate of future transmissions.

Certain aspects of the present disclosure present a method for wireless communication. The method generally includes receiving a plurality of hybrid automatic repeat request (HARQ) packets from an apparatus, and dropping one or more of the HARQ packets at a physical layer based on a given probability when an overload condition happens.

Certain aspects of the present disclosure present a method for wireless communication between a base station and a user equipment (UE). The method generally includes receiving a plurality of Radio Link Control (RLC) protocol data units (PDUs) from the base station, determining a memory overload condition by the UE, and reducing an RLC window size by the UE during which RLC PDUs may be received.

Certain aspects of the present disclosure present an apparatus for wireless communication. The apparatus generally includes means for receiving a packet from an apparatus through a channel, means for determining an advertised channel quality indicator (CQI) value indicating information regarding a degraded channel when an overload condition happens, wherein the advertised CQI value is determined based on at least one of an actual CQI of the channel, a target flow rate or channel bandwidth, means for determining a modified acknowledgment message based at least on the advertised CQI and an actual acknowledgment message, wherein the actual acknowledgment message indicates whether or not the packet is received correctly, and means for transmitting the advertised CQI and the modified acknowledgment message to the apparatus to adjust flow rate of future transmissions.

Certain aspects of the present disclosure present an apparatus for wireless communication. The apparatus generally includes means for receiving a plurality of hybrid automatic repeat request (HARQ) packets from an apparatus, and means for dropping one or more of the HARQ packets at a physical layer based on a given probability when an overload condition happens.

Certain aspects of the present disclosure present an apparatus for wireless communication between a base station and a user equipment (UE). The apparatus generally includes means for receiving a plurality of Radio Link Control (RLC) protocol data units (PDUs) from the base station, means for determining a memory overload condition by the UE, and means for reducing an RLC window size by the UE during which RLC PDUs may be received.

Certain aspects provide a computer-program product for wireless communications. The computer-program product typically includes a computer-readable medium having instructions stored thereon, the instructions being executable by one or more processors. The instructions generally include instructions for receiving a packet from an apparatus through a channel, instructions for determining an advertised channel quality indicator (CQI) value indicating information regarding a degraded channel when an overload condition happens, wherein the advertised CQI value is determined based on at least one of an actual CQI of the channel, a target flow rate or channel bandwidth, instructions for determining a modified acknowledgment message based at least on the advertised CQI and an actual acknowledgment message, wherein the actual acknowledgment message indicates whether or not the packet is received correctly, and instructions for transmitting the advertised CQI and the modified acknowledgment message to the apparatus to adjust flow rate of future transmissions.

Certain aspects provide a computer-program product for wireless communications. The computer-program product typically includes a computer-readable medium having instructions stored thereon, the instructions being executable by one or more processors. The instructions generally include instructions for receiving a plurality of hybrid automatic repeat request (HARQ) packets from an apparatus, and instructions for dropping one or more of the HARQ packets at a physical layer based on a given probability when an overload condition happens.

Certain aspects provide a computer-program product for wireless communications between a base station and a user equipment (UE). The computer-program product typically includes a computer-readable medium having instructions stored thereon, the instructions being executable by one or more processors. The instructions generally include instructions for receiving a plurality of Radio Link Control (RLC) protocol data units (PDUs) from the base station, instructions for determining a memory overload condition by the UE, and instructions for reducing an RLC window size by the UE during which RLC PDUs may be received.

Certain aspects of the present disclosure present an apparatus for wireless communication. The apparatus generally includes at least one processor and a memory coupled to the at least one processor. The at least one processor is typically configured to receive a packet from an apparatus through a channel, determine an advertised channel quality indicator (CQI) value indicating information regarding a degraded channel when an overload condition happens, wherein the advertised CQI value is determined based on at least one of an actual CQI of the channel, a target flow rate or channel bandwidth, determine a modified acknowledgment message based at least on the advertised CQI and an actual acknowledgment message, wherein the actual acknowledgment message indicates whether or not the packet is received correctly, and transmit the advertised CQI and the modified acknowledgment message to the apparatus to adjust flow rate of future transmissions.

Certain aspects of the present disclosure present an apparatus for wireless communication. The apparatus generally includes at least one processor and a memory coupled to the at least one processor. The at least one processor is typically configured to receive a plurality of hybrid automatic repeat request (HARQ) packets from an apparatus and to drop one or more of the HARQ packets at a physical layer based on a given probability when an overload condition happens.

Certain aspects of the present disclosure present an apparatus for wireless communication. The apparatus generally includes at least one processor and a memory coupled to the at least one processor. The at least one processor is typically configured to receive a plurality of Radio Link Control (RLC) protocol data units (PDUs) from the base station, determine a memory overload condition by the UE, and reduce an RLC window size by the UE during which RLC PDUs may be received.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA), Time Division Multiple Access (TDMA), Frequency Division Multiple Access (FDMA), Orthogonal Frequency Division Multiple Access (OFDMA), Single Carrier Frequency Division Multiple Access (SC-FDMA) and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
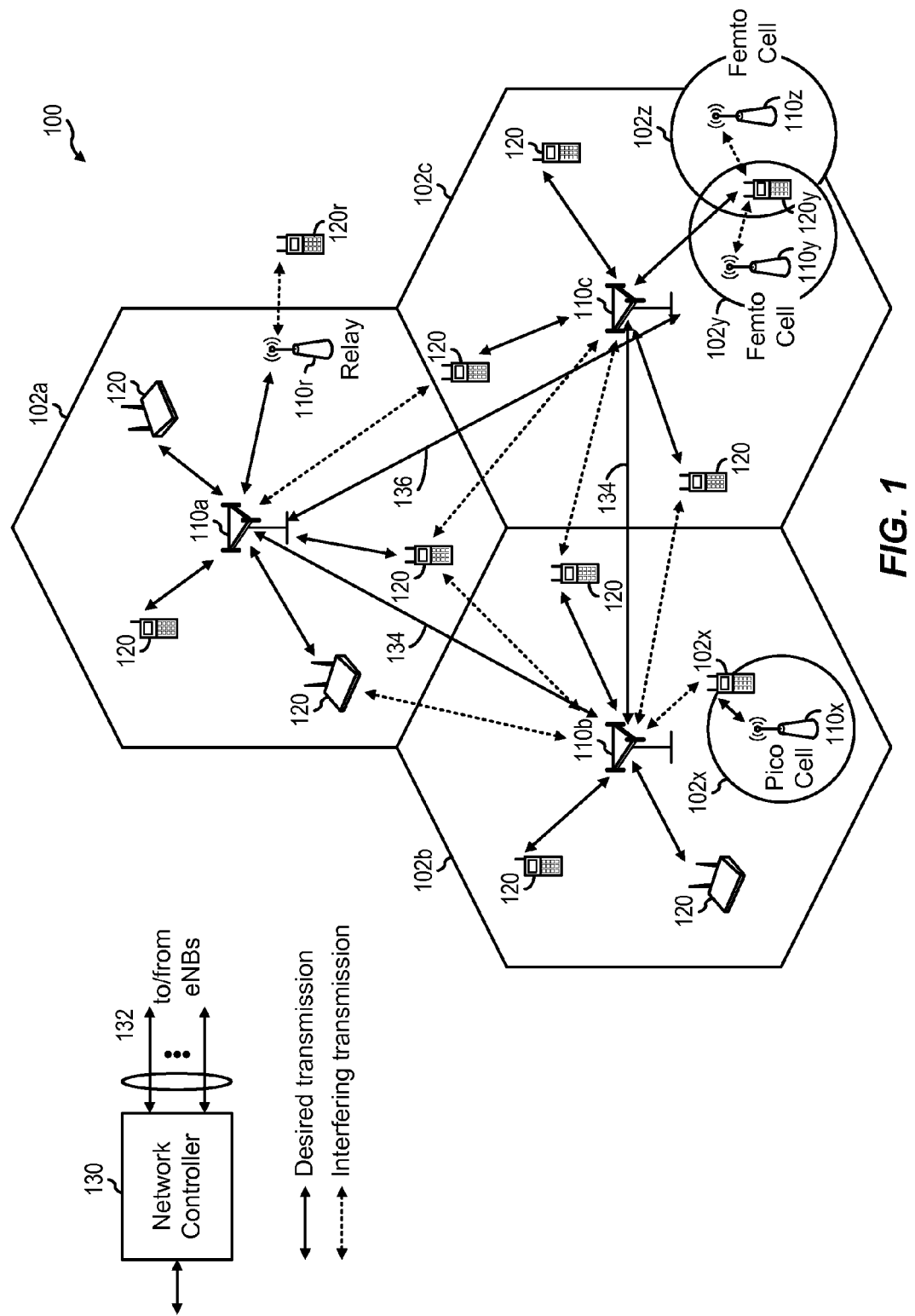
FIG. 1 is a block diagram conceptually illustrating an example of a mobile communication system.

FIG. 1 shows a wireless communication network 100, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110a, 110b and 110c are macro eNBs for the macro cells 102a, 102b and 102c, respectively. The eNB 110x is a pico eNB for a pico cell 102x. And, the eNBs 110y and 110z are femto eNBs for the femto cells 102y and 102z, respectively. An eNB may support one or multiple (e.g., two, three, four, and the like) cells.

The wireless network 100 also includes relay stations. A relay station is a station that receives a transmission of data and/or other information from an upstream station (e.g., an eNB, a UE, or the like) and sends a transmission of the data and/or other information to a downstream station (e.g., another UE, another eNB, or the like). A relay station may also be a UE that relays transmissions for other UEs. In the example shown in FIG. 1, a relay station 110r may communicate with the eNB 110a and a UE 120r, in which the relay station 110r acts as a relay between the two network elements (the eNB 110a and the UE 120r) in order to facilitate communication between them. A relay station may also be referred to as a relay eNB, a relay, and the like.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

A network controller 130 may couple to a set of eNBs and provide coordination and control for these eNBs. The network controller 130 may communicate with the eNBs 110 via a backhaul 132. The eNBs 110 may also communicate with one another, e.g., directly or indirectly via a wireless backhaul 134 or a wireline backhaul 136.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.25, 2.5, 5, 10 or 20 MHz, respectively.

Figure 2:
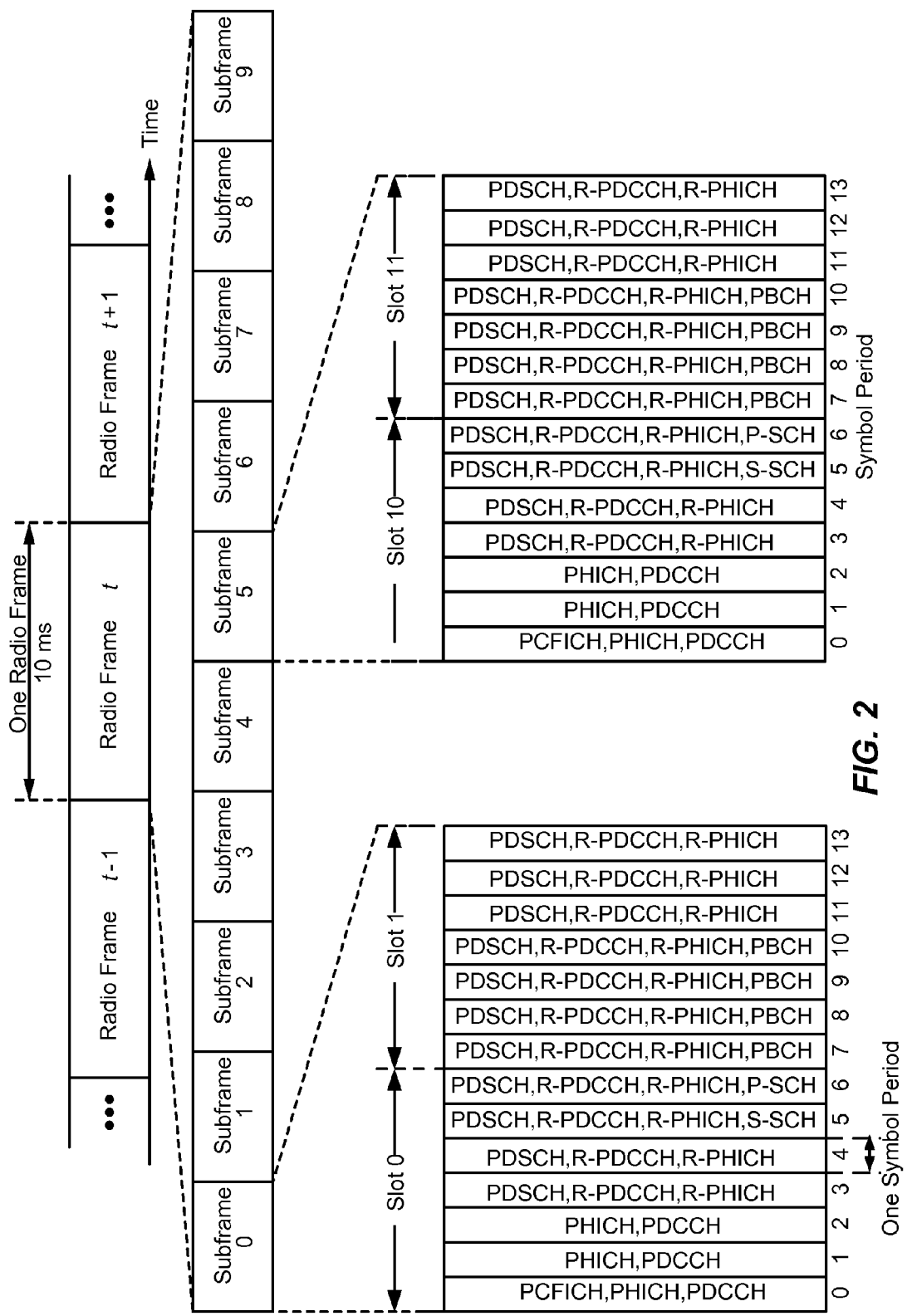
FIG. 2 is a block diagram conceptually illustrating an example of a downlink frame structure in a mobile communication system.

FIG. 2 shows a downlink frame structure used in LTE/-A. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE/-A, an eNB may send a primary synchronization signal (PSS) and a secondary synchronization signal (SSS) for each cell in the eNB on a Primary Synchronization Channel (P-SCH) and a Secondary Synchronization Channel (S-SCH), respectively. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical Hybrid Automatic Repeat Request (HARQ) Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support Hybrid Automatic Repeat Request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

In addition to sending PHICH and PDCCH in the control section of each subframe, e.g., the first symbol period of each subframe, the eNB may also transmit these control-oriented channels in the data portions of each subframe as well. As shown in FIG. 2, these new control designs utilizing the data region, e.g., the Relay-Physical Downlink Control Channel (R-PDCCH) and Relay-Physical HARQ Indicator Channel (R-PHICH) are included in the later symbol periods of each subframe. The R-PDCCH is a new type of control channel utilizing the data region originally developed in the context of half-duplex relay operation. Different from legacy PDCCH and PHICH, which occupy the first several control symbols in one subframe, R-PDCCH and R-PHICH are mapped to resource elements (REs) originally designated as the data region. The new control channel may be in the form of Frequency Division Multiplexing (FDM), Time Division Multiplexing (TDM), or a combination of FDM and TDM.

The eNB may send the P-SCH, S-SCH and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the P-SCH, S-SCH, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), and the like.

Figure 3:
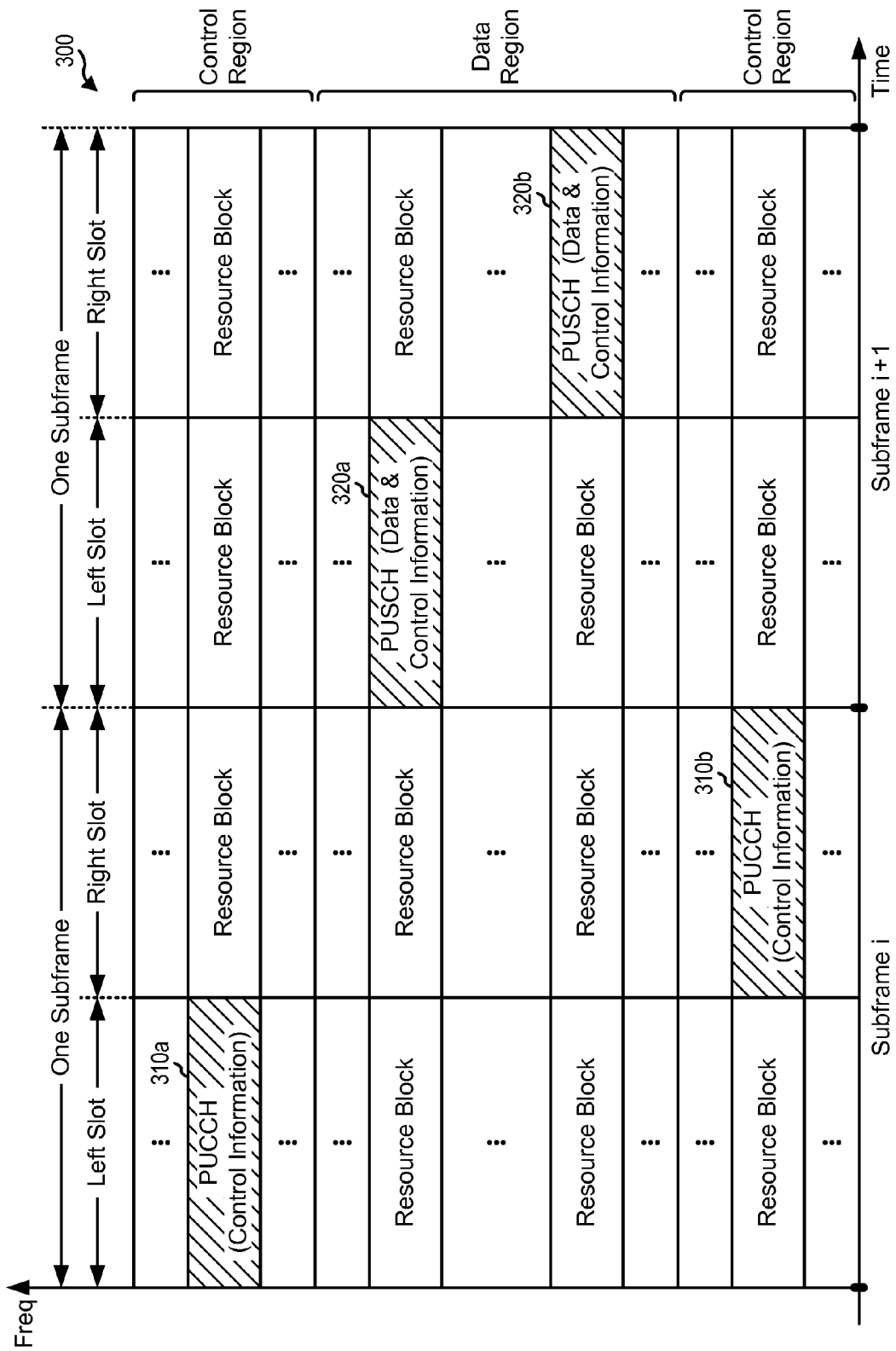
FIG. 3 is a block diagram conceptually illustrating an exemplary frame structure in uplink communications.

FIG. 3 is a block diagram conceptually illustrating one or more portions of an exemplary frame structure 300 in uplink LTE/-A communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNode B. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the uplink resources. For example, a control and a data channel, parallel control channels, and parallel data channels may be transmitted by a UE.

The PSS, SSS, CRS (common reference signal), PBCH, PUCCH, PUSCH, and other such signals and channels used in LTE/-A are described in 3GPP TS 36.211, entitled "Evolved Universal Terrestrial Radio Access (E-UTRA); Physical Channels and Modulation," which is publicly available.

Figure 4:
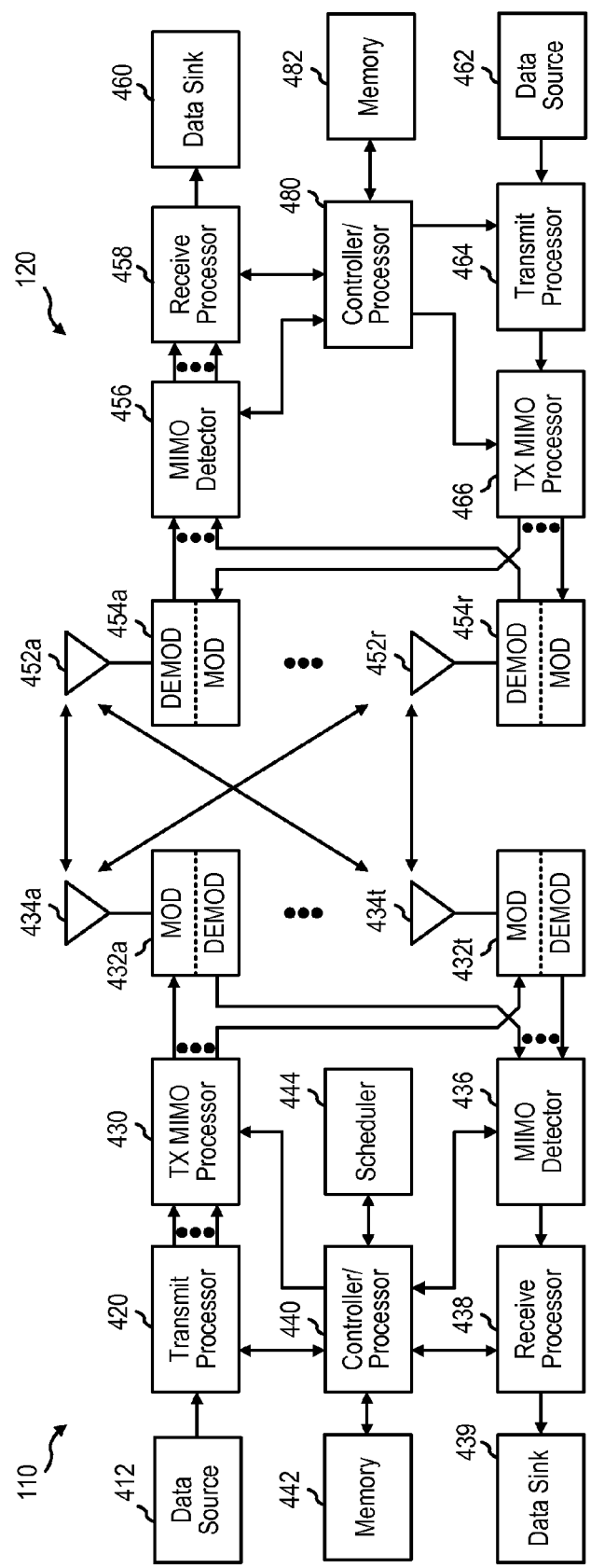
FIG. 4 is a block diagram conceptually illustrating a design of a base station and a user equipment (UE) configured according to one aspect of the present disclosure.

FIG. 4 shows a block diagram of a design of a base station/eNB 110 and a UE 120, which may be one of the base stations/eNBs and one of the UEs in FIG. 1. The base station 110 may be the macro eNB 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the base station 110, the uplink signals from the UE 120 may be received by the antennas 434, processed by the modulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct the execution of various processes for the techniques described herein. The processor 480 and/or other processors and modules at the UE 120 may also perform or direct the execution of the functional blocks and/or other processes for the techniques described herein. The memories 442 and 482 may store data and program codes for the base station 110 and the UE 120, respectively. A scheduler 444 may schedule UEs for data transmission on the downlink and/or uplink.

In one configuration, the UE 120/eNB 110 configured for wireless communication includes transmitting means and receiving means. In one aspect, the aforementioned means may be the processor(s), the controller/processor 480, the memory 482, the receive processor 458, the MIMO detector 456, the demodulators 454a, and the antennas 452a configured to perform the functions recited by the aforementioned means. In another aspect, the aforementioned means may be a module or any apparatus configured to perform the functions recited by the aforementioned means.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Certain aspects of the present disclosure provide a system and method for downlink rate control by the UE. The downlink rate control method may be used when an overload condition happens at the UE. For example, the UE may experience central processing unit (CPU) overload, memory overload, or overheating. For certain aspects, the UE may simulate a "degraded channel" in order to cause an eNodeB to lower a transmission rate or block-size as it would in response to receiving an indication of bad channel conditions. The UE may simulate a degraded channel by modifying a channel quality indicator (CQI), and transmitting negative acknowledgment (NACK) messages to the eNodeB. Therefore, the eNodeB may be responsible for guaranteeing quality of service (QoS) based on the new, degraded channel condition. Aspects of the present disclosure describe a method for choosing a target downlink rate as well as a method that can be used to achieve the target rate. Another aspect of the present disclosure presents a method for controlling rate of downlink transmissions by dropping packets at physical layer. For certain aspects, the dropped packets may be acknowledged.

In some standards such as the High Speed Packet Access (HSPA), downlink flow control may be performed by decreasing the Radio Link Control (RLC) Automatic Repeat Request (ARQ) window size. In earlier releases of the HSPA, the window size had a direct relationship with the maximum achievable data rate as follows:

$$\text{Data\_rate} = \frac{1}{2} \ast (\text{window\_size} \ast \text{RLC\_PDU\_size}) / \text{RTT}$$

in which RLC_PDU_size is the size of a protocol data unit (PDU) in radio link control (RLC) layer, and round trip time (RTT) refers to the time duration in which a packet travels from a specific source to a specific destination and back again. The above equation assumes a constant PDU size for RLC. However, some standards such as recent releases of the HSPA allow a flexible PDU size for RLC. Therefore, the ARQ window size may not provide a hard limit for the RLC PDU size.

Flow Control Via Reduction of RLC Window Size

Traditionally, downlink flow control is performed by reducing a Radio Link Control (RLC) window size, which in turn may reduce the downlink rate. Since a method for notifying the eNodeB about the updated window size is not defined in the LTE/-A standard, there may be a mismatch between window sizes considered by the sender and the receiver. At the receiver (e.g., UE in case of downlink traffic), RLC PDUs that are outside of the receive window may be dropped. The eNodeB may then re-transmit the dropped RLC PDUs.

If flow control is triggered (e.g., unilaterally by the UE due to memory overload), size of the receive window may be reduced while the UE waits for the arrival of the new packet.

For example, the new size may be half of the default receive window size. Consequently, reducing the number of packets in flight. In this manner, the downlink flow control method by reducing RLC window size may quickly reduce the load on higher layers. It may also reduce the memory requirements. However, this method may cause several RLC PDUs to be dropped while the UE waits for the missing PDU. Also, unless the UE is waiting for the missing packet, RLC window size reduction may have little effect on the higher layer throughput.

The downlink flow control based on reducing RLC window size may be initiated by a memory trigger which can occur when one of the RLC PDUs is not successfully received after several retransmissions. The probability of this event may depend on the success rate of one RLC retransmission as well as total number of retransmissions. For example, assuming each RLC transmission is successful with probability of 0.01 and that each re-transmission can occur after 30 milliseconds (ms), then if the UE has budgeted enough memory for 100 ms worth of RLC PDUs, this translates to an RLC packet missing after three retransmissions. The probability of this event may be equal to $10^{-6}$. The RLC window size reduction may be used for memory-based flow control to quickly resolve the memory issue due to RLC errors. However, in an errorless environment, this method may not effectively reduce the higher layer throughput and therefore may not alleviate more long term effects such as slow application processing.

It should be noted that the memory-based flow control by reducing RLC window size may be effective if an RLC packet is not received after several attempts. In this case, RLC packets with higher sequence numbers may be buffered until the missing packet is received. Assuming that the success probability of one RLC transmission is 0.01 and the delay between each RLC retransmission is about 30 ms, for example, if the buffer can hold up to 100 ms worth of data with peak data rate, the window based flow control may be initiated once every $10^6$ RLC packets. Assuming one RLC packet is received every 1 ms, this corresponds to initiating the window based flow control once every 16 minutes.

Flow Control Via CQI Reporting

For certain aspects, Channel Quality Information (CQI) may be used to influence downlink flow rates. Usually, an eNodeB derives a transport block size and Modulation and Coding Scheme (MCS) based on a received CQI. For example, in the LTE/-A standard, CQI index equal to one may correspond to Quadrature phase shift keying (QPSK) and code rate of 78×1024, and CQI index equal to seven may correspond to 16QAM (Quadrature Amplitude Modulation) and code rate of 378×1024 (see 3GPP TS 36.213 v8.8.0).

One problem with the CQI-based flow control is that some operators adjust the downlink rate based on a loss rate measured on the downlink. Lowering the CQI by the UE due to flow control may result in a reduced loss rate on the HARQ channels. Therefore, eNodeB may adjust the CQI that is received from the UE by adding an offset to the CQI that is reported by the UE. This offset, in effect may cancel the flow control and cause the DL rate to increase again.

Figure 5:
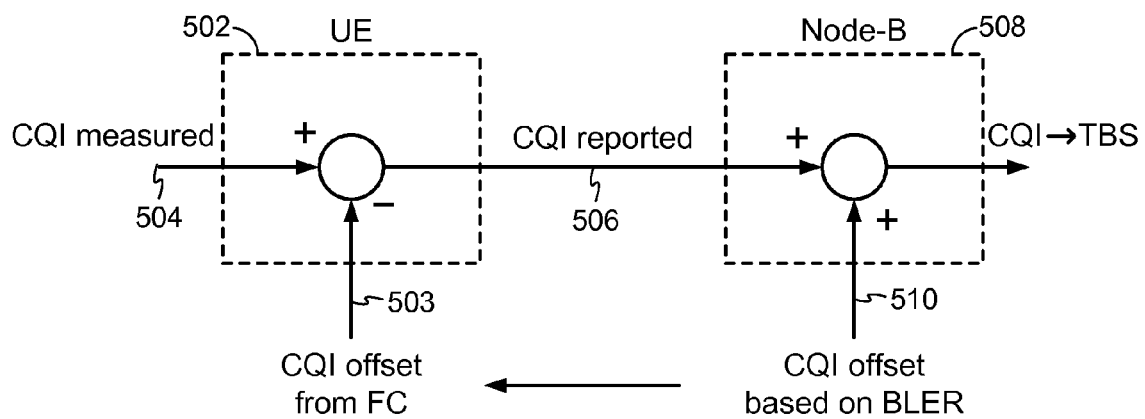
FIG. 5 illustrates an example channel quality information (CQI)-based flow control method and a block error rate (BLER) based scheduler in an eNodeB, in accordance with certain aspects of the present disclosure.

FIG. 5 illustrates an example CQI based flow control method and a block error rate (BLER) based scheduler in an eNodeB, in accordance with certain aspects of the present disclosure. A UE 502 measures CQI 504 and subtracts a flow control offset 503 to reduce the CQI reported 506 to an eNodeB 508 in an effort to reduce a downlink flow rate. When the reduced CQI is reported by the UE 502, a reduced loss rate on the HARQ channels may result. In response to detecting the reduced loss rate on HARQ channels, the eNodeB 508 may attempt to drive the loss rate toward an expected range by adding a CQI offset based on the reduced loss rate 510 to the reported CQI 506. This offset may effectively cancel the flow control and causes the downlink rate to increase again. This may occur, for example, when a Block Error Rate (BLER) based scheduler is implemented at the eNodeB. In such cases, even though the reported CQI is reduced, due to decreased error rate on the downlink, the eNodeB may increase the rate after a short time.

Certain aspects of the present disclosure provide methods and apparatus based on Channel Quality Indicator (CQI) adjustment and Hybrid Automatic Repeat Requests (HARQs) Negative-Acknowledgment (NACK) control in order to achieve a desired average downlink rate and/or to utilize a specific Modulation and Coding Scheme (MCS). Aspects of the present disclosure relate to the design of a downlink flow control feature in LTE/-A wireless communication systems. However, aspects discussed herein are not limited to LTE/-A and may be used in other systems and standards, all of which fall within the scope of the current disclosure.

Flow Control Via CQI and NACK Reporting

Certain aspects of the present disclosure involve combining CQI control and HARQ Negative-Acknowledgment (NACK) transmission from a UE to control downlink flow rate of an eNodeB. In this manner, upon receiving the trigger for flow control and/or determining the new target rate, the UE updates the CQI to reflect the new desired downlink (DL) throughput. As an example, when CQI is reduced, the over the air packet error rate may also be reduced. Therefore, the UE may send HARQ NACKs so that the eNodeB would treat the new situation as a "real" drop in the channel quality. Therefore, the eNodeB may be responsible for guaranteeing the QoS based on the new "degraded channel condition".

Figure 6:
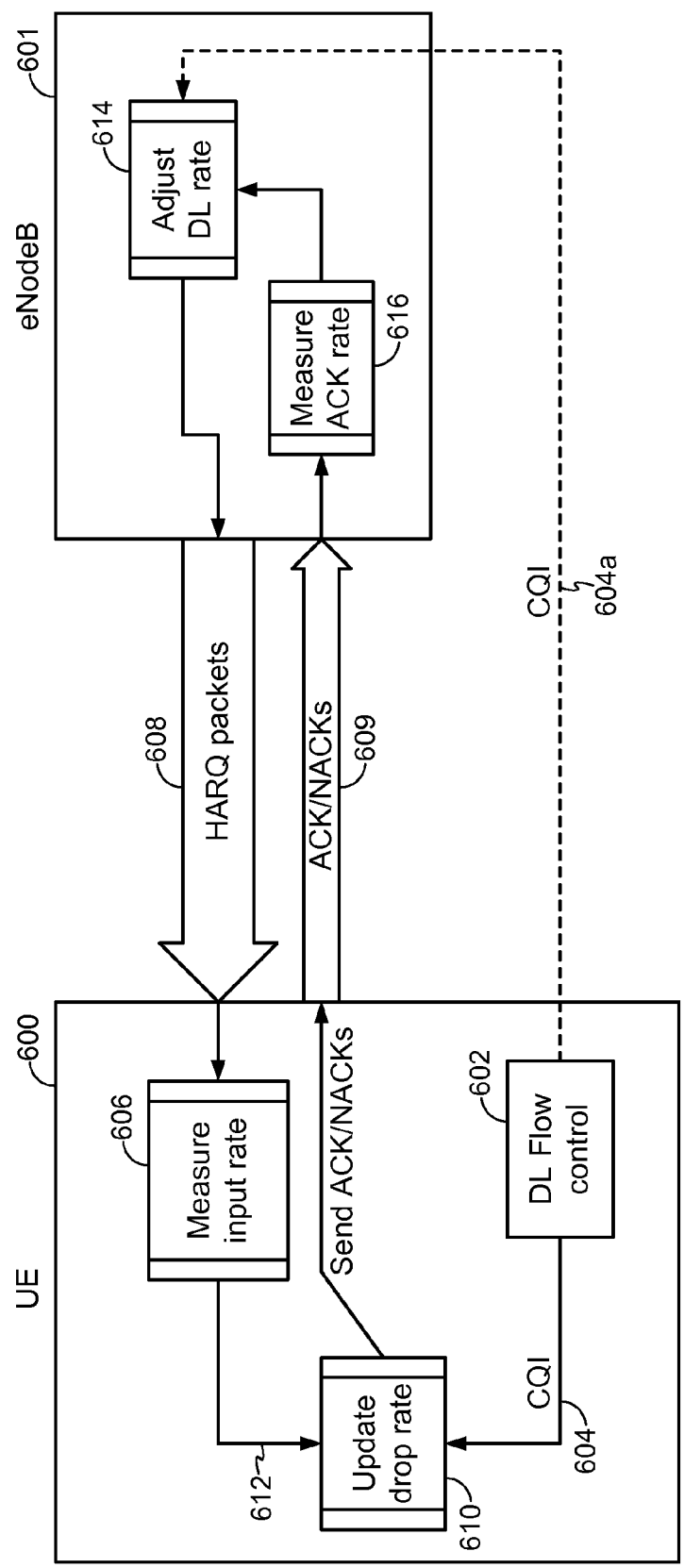
FIG. 6 illustrates an example block diagram of a flow control method based on CQI and negative acknowledgment (NACK) transmission, in accordance with certain aspects of the present disclosure.

FIG. 6 illustrates a block diagram of the flow control method based on CQI and NACK transmission, in accordance with certain aspects of the present disclosure.

After receiving a trigger for flow control and determining a new target rate, a downlink flow control block 602 may update CQI 604, to generate an advertised CQI 704a which reflects the new target downlink throughput corresponding to the target rate. When CQI is reduced, the over the air packet error rate may also be reduced. To prevent the eNodeB 601 from offsetting the CQI and increasing the flow rate in response to detecting the lower error rate, the UE 600 may send (e.g., unnecessarily) a few HARQ NACK messages. Therefore, the eNodeB 601 may treat the new situation as a "real" drop in the channel quality.

The UE 600 may first measure the input rate 606 of the HARQ packets 608 that are received from the eNodeB 601. The UE 600 may then update a drop rate 610 indicating the number of random HARQ NACKs 609 to be sent over a certain time period in response to the HARQ packet rate measurement 612 and the downlink flow control CQI 602. In order to guarantee the Quality of Service (QoS) based on the new degraded channel condition, the eNodeB 601 may reduce the downlink flow rate 614 in response to measuring the ACK rate 616 and receiving the flow control CQI 604a.

In the flow control method based on CQI and NACK transmission, QoS may be maintained for low rate, delay-sensitive or loss-sensitive applications. In addition, communication between RLC and the physical layer (e.g., layer 1) regarding the priority for different packets is not needed. Furthermore, the eNodeB may be unable to detect that a UE is performing flow control because the flow control method utilizes functionalities that are already present in the eNodeB.

In the aspect described with reference to FIG. 6, it is assumed that the Block Error (BLER)-based rate control is implemented in the eNodeB, although this particular implementation may not have an effect on the processing at the UE-side.

Figure 7:
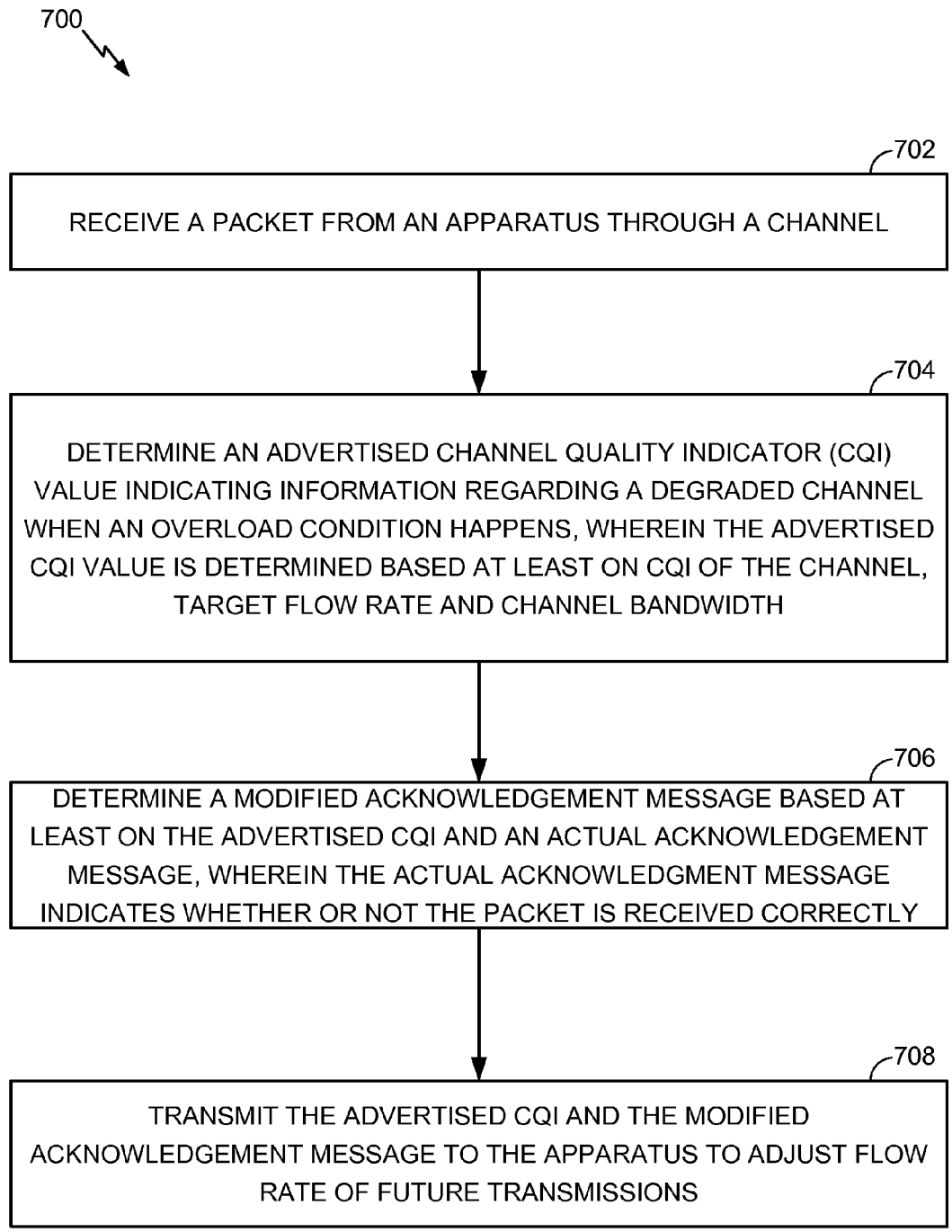
FIG. 7 illustrates example operations that may be performed by a user equipment for downlink flow control based on CQI and NACK transmission, in accordance with certain aspects of the present disclosure.

FIG. 7 illustrates example operations 700 that may be performed by a user equipment for downlink flow control utilizing the method based on CQI and NACK transmission, in accordance with certain aspects of the present disclosure. At 702, the UE may receive a packet from an apparatus (e.g., an eNodeB) through a channel. At 704, the UE may determine an advertised channel quality indicator (CQI) value indicating information regarding a degraded channel when an overload condition happens, wherein the advertised CQI value is determined based at least on one of CQI of the channel, target flow rate and channel bandwidth. At 706, the UE may determine a modified acknowledgment message based at least on one of the advertised CQI and an actual acknowledgment message, wherein the actual acknowledgment message indicates whether or not the packet is received correctly. At 708, the UE may transmit the advertised CQI and the modified acknowledgment message to the apparatus to adjust flow rate of future transmissions.

Figure 8:
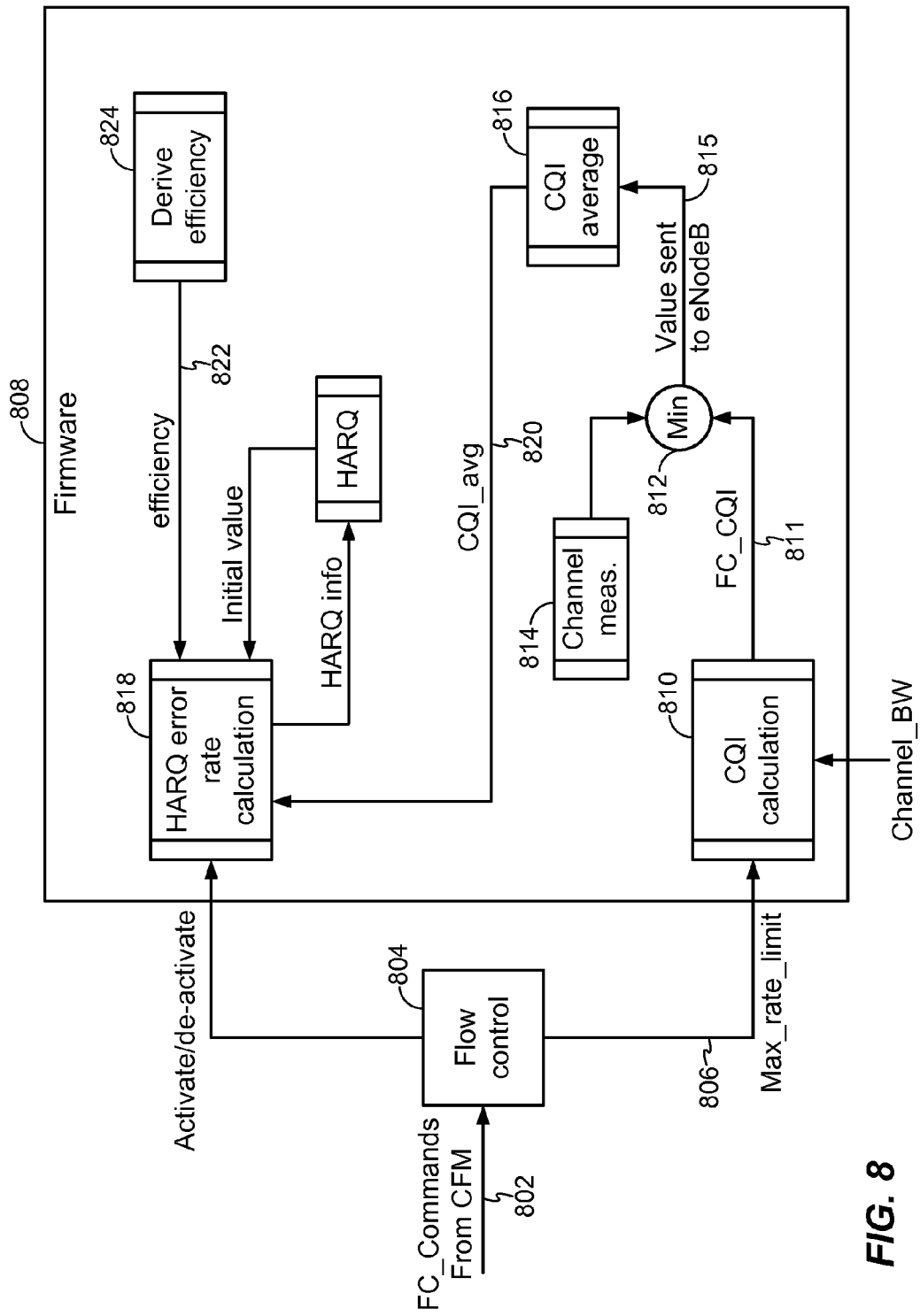
FIG. 8 illustrates an example architecture for implementing the method of downlink flow control using CQI reporting and NACK transmission, in accordance with certain aspects of the present disclosure.

FIG. 8 illustrates an example architecture that may be used by a user equipment utilizing the flow control method based on CQI and NACK transmission, in accordance with certain aspects of the present disclosure. In this example architecture some of the functionality may be implemented in firmware 808 to take advantage of HARQ operation and channel measurement results that are already available in the firmware, although it is not limited to a firmware implementation.

As illustrated, either a Centralized Flow-control Manager (CFM), or monitors (e.g., temperature monitors, CPU monitors, memory monitors, and the like) may generate flow control commands 802 and convey them to a downlink flow control block 804 inside the UE. The downlink flow control block 804 may select a target rate (e.g., Max_rate_limit 806) based on the received flow control command (FC_command) and adjust one or more parameters in order to achieve the desired downlink rate.

The flow control command 802 may include OFF, UP, FREEZE, DOWN, SET_MIN, SHUT_DOWN and other commands. The downlink flow control block 804 may also receive a value for "step_timer" when the command is UP, OFF, or DOWN. The flow control state may be derived based on the FC_Commands.

Figure 9:
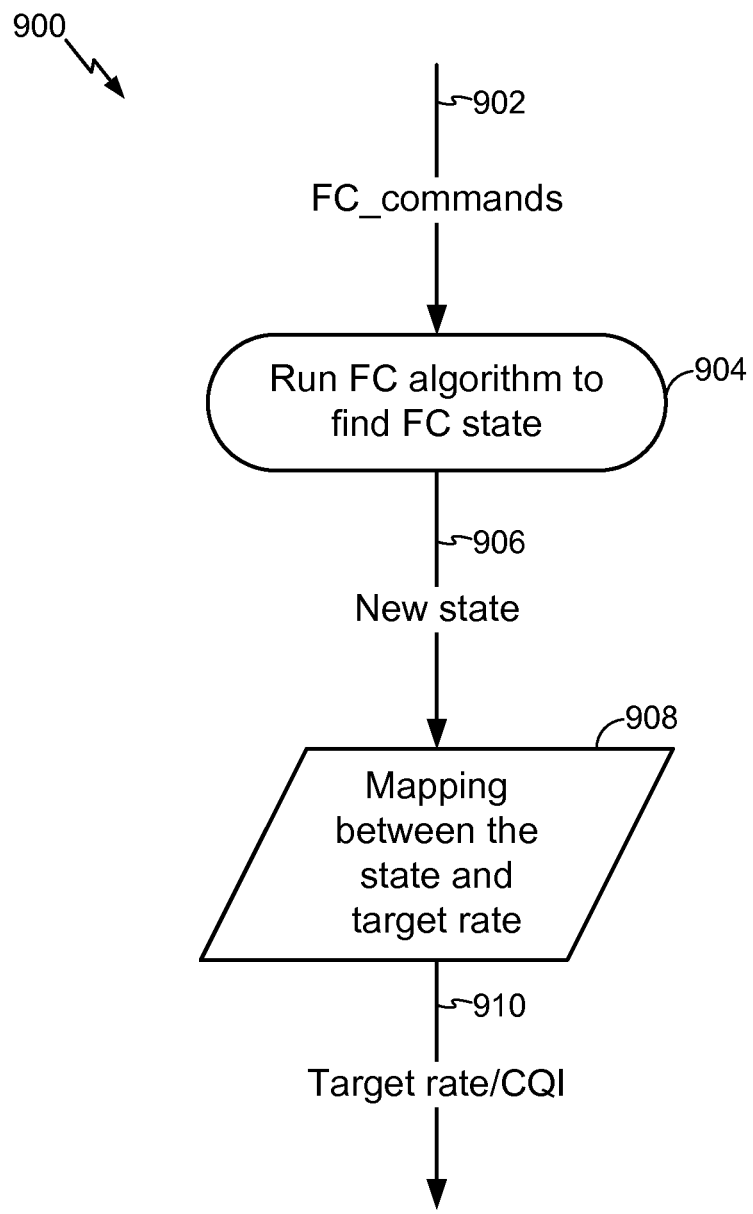
FIG. 9 is a flow chart illustrating a method of downlink flow control according to one aspect of the disclosure.

FIG. 9 illustrates an example method 900 that may be performed by a downlink flow control module 804 for determining target rate and/or CQI, in accordance with certain aspects of the present disclosure. The downlink flow control module 804 receives the FC_commands 802 and determines the specific state of the flow control based on the received FC commands using a flow control algorithm 904. The flow control algorithm 904 may also determine a new state 906 of the flow control based on the current state and current CQI value. The flow control module may then map the new state to a target rate and/or CQI value based on a predetermined table or based on an equation.

Certain aspects of the present disclosure present an example flow control algorithm to be used to determine the flow control state and/or target flow rate. The flow control algorithm utilizes the following parameters: HIGHEST, which represents the highest state number, and DEFAULT, which represents the default state. The flow control algorithm may have the following steps:

If FC receives command SHUT DOWN:
    Drop all active connections.
If FC receives command SET_MIN:
    Set the rate to the minimum configured value.
If FC receives command DOWN:
    If fc_flag=OFF:
        Choose the Initial rate that is a configurable parameter.
        Set fc_flag=ON
    Else, if fc_flag=ON:
        reduce the bandwidth by one step
        If Min_level is reached
            Send the Min_level_reached indication to CCM.
        Else
            Start step_timer if the current pattern is not associated with the largest bandwidth reduction.
If fc_flag=ON and FC receives command UP:
    Increase the bandwidth by one step until the maximum performance level is reached.
    If the maximum performance level is not reached, restart step_timer; else send a Max_level_reached indication to CCM.
If fc_flag=ON and FC receives command OFF:
    If the Max performance level is reached, set fc_flag=OFF and send a Max_level_reached indication to CCM.
    Else:
        Increase the bandwidth by one step.
If fc_flag=ON and FC receives command FREEZE:
    Reset step_timer, if it is running.
    Maintain the current performance level.
If step_timer expires:
    If the last received command is DOWN:
        Decrease the rate by one step
        If it is not the minimum performance level, restart step_timer, else send a Min_Level reached indication to CCM.
    If the last received command is UP or OFF:
        If currently at maximum performance level:
            Send the Max_level_reached indication to CCM.
            Set fc_flag=OFF.
        Increase the rate until maximum performance level is reached.
        Else, restart step_timer.

Figure 10:
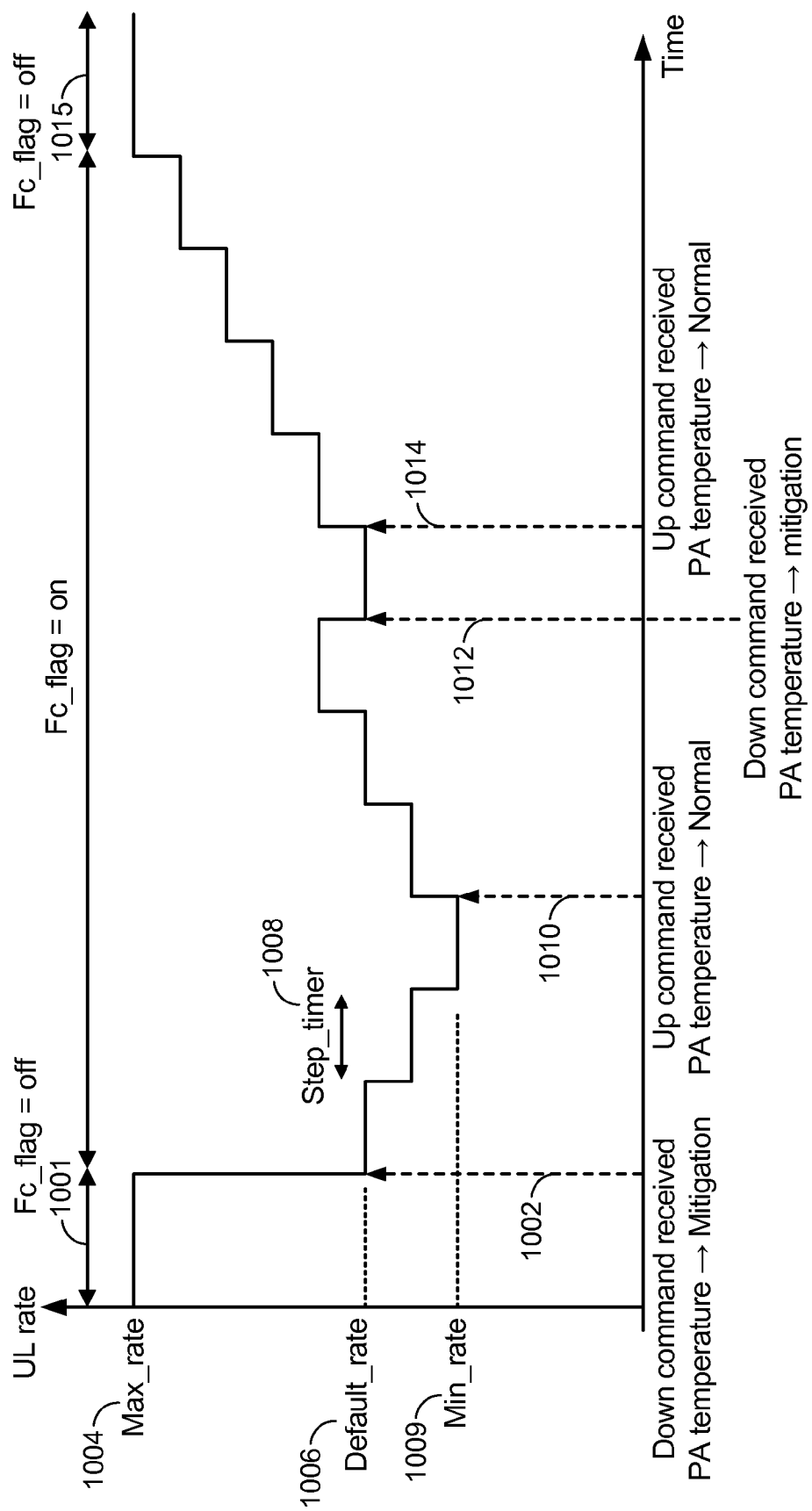
FIG. 10 illustrates an example path of the flow control based on CQI and NACK transmission according to aspects of the present disclosure.

FIG. 10 illustrates an example path of the flow control method based on CQI and NACK transmission according to aspects of the present disclosure. At time 1002, a flow control "DOWN" command is received to perform power amplification (PA) and/or temperature mitigation, for example. A flow control flag (e.g., fc_flag) is set to "ON" 1001, and the uplink rate is reduced from a maximum or increased rate 1004 to a default rate 1006. The uplink rate is then further reduced by one step for each of three step timer periods 1008 to a reduced or minimum rate 1009. At time 1010, a flow control "UP" command is received when PA temperature reaches a normal level, for example. The uplink rate increases by one step for each step timer period until another "DOWN" command is received at time 1012 and the uplink rate is reduced by one step for PA temperature mitigation. At time 1014, another "UP" command is received because PA temperature has again reached a normal level. The uplink rate may be increased by one step for each step-timer period until a target or maximum rate 1004 is reached. When the target rate 1004 is reached, the flow control flag may be set to "OFF" 1015.

For certain aspects, the downlink flow control block 804 maps the current state into a target rate 908, and outputs a target rate and/or CQI level 910. Mapping between the current state and target rate may input the current state number and return either a specific target rate and/or a specific CQI. A benefit of mapping to a specific target rate is that it gives more flexibility in controlling the downlink rate. However, the channel bandwidth may also affect the target rate. If a specific target rate is desired, an additional block may translate the desired rate to a specific CQI. Mapping the state to a specific CQI index may simplify the implementation. An example of mapping between state and target rate, according to an aspect may be as follows:

State 0: Target downlink rate=1 Mbps
State 1: Target downlink rate=5 Mbps
State 2: Target downlink rate=10 Mbps
State 3, DEFAULT: Target downlink rate=25 Mbps
State 4: Target downlink rate=50 Mbps
State 5: HIGHEST=OFF state Referring again to FIG. 8, the CQI value may be derived by a CQI calculation block 810 from the maximum rate limit 806 and the channel bandwidth. The CQI value may correspond to the spectral efficiency that can be supported by the UE. Inputs to the CQI calculation block 810 are maximum rate limit (denoted Max_rate_limit) and channel bandwidth in terms of number of resource blocks (denoted channel_BW). The CQI value output from the CQI calculation block 810 is denoted FC_CQI 811.

According to aspects of the present disclosure, the FC_CQI may be derived by first calculating the flow control efficiency (FC_efficiency), as follows:

$$FC\_efficiency = (Max\_rate\_limit * TTI/2) / (channel\_BW * NUM\_RE\_PER\_RB),$$

in which TTI denotes the transmission time interval and NUM_RE_PER_RB denotes the number of resource elements in each resource block. In an exemplary LTE/-A embodiment, TTI may be equal to 1 ms and the NUM_RE_PER_RB may be equal to 160 for short cyclic prefix (CP) format.

For certain aspects, the target CQI value may be chosen based on the FC_efficiency from a mapping table (e.g., the 4-bit CQI table 7.2.3-1 as described in TS 36.213) such that the maximum CQI value does not exceed the efficiency requirements of the chosen CQI. According to aspects of the present disclosure, a comparison block 812 may report the smaller of the CQI obtained from the flow control module (FC_CQI) 811 and the CQI obtained from a channel quality measurement module 814. The CQI value reported to the eNodeB (e.g., the advertised CQI 815) may also be sent to a CQI averaging block 816 to calculate average CQI value 820.

A HARQ error rate calculation block 818 may adjust the probability of generating HARQ NACK based on the average CQI 820 and the average downlink spectral efficiency 822 that was received from the eNodeB. The derived probability may then be used in HARQ operation.

For certain aspects of the present disclosure, a UE may randomly send a NACK message for HARQ packets that are received correctly on the downlink based on a probability $P_{HARQ}$. If the packet is received successfully, the packet may be kept in a buffer until the last retransmission or until an ACK for the packet is triggered.

According to aspects of the present disclosure, ACK/NACK generation may be based on the following rules: If CQI is sent based on channel condition, then no changes may be made to regular ACK/NACK transmissions (e.g., when FC_CQI is at a highest level). If CQI is sent based on a "target rate" specified by a flow control component, the following steps may be performed on each HARQ channel after each transmission/re-transmission:

If the packet is received in error, a NACK message may be sent.

If the packet is received successfully, an ACK message may be sent with probability $1 - P_{HARQ}$ and a NACK message may be sent with probability $P_{HARQ}$, but the packet may be kept in the buffer.

If a packet is successfully received, but a NACK is transmitted to the eNodeB, the packet may be kept in the buffer. If a new transmission is received on that HARQ channel, the successfully received packet may be passed to the higher layer. If the packet is retransmitted, an ACK may be sent based on the rules specified above.

The processing specified in the above example simulates a degraded channel in which the reported CQI appears as an "actual" CQI value according to an aspect of the present disclosure.

A target error rate for each HARQ transmission may depend on target error rate at an eNodeB and a number of retransmissions, which may not be known at the UE. For example, if the target error rate is a 1% error rate and the maximum number of transmissions is set to three, the error rate for each HARQ transmission may be equal to $(0.01)^{1/3} = 0.22$, assuming a chase combining method.

According to aspects of the present disclosure, the UE may keep track of the actual HARQ error rate during normal operation and use the calculated HARQ error rate as the initial value when flow control is triggered. If no initial value is available when flow control is triggered, a configurable default initial value may be used (e.g., default value=0.25).

For certain aspects, the UE may keep track of the average downlink rate (e.g., in situations where a specific downlink target rate is specified) and/or the average "MCS efficiency" of the received blocks. Herein, it is assumed that a specific CQI is the target rather than using a target downlink rate. Therefore, the received "MCS efficiency" may be measured on the downlink. However, the method may easily be extended to take into account a specific target rate.

For certain aspects, the probability of acknowledging HARQ transmissions ($P_{HARQ}$) may be adjusted at the UE as follows:

If average_rate>target_rate+$H\_UE \rightarrow p_{HARQ} = p_{HARQ} + \delta_{UE}$ If average_rate<target_rate−$H\_UE \rightarrow p_{HARQ} = p_{HARQ} - \delta_{UE}$ in which H_UE may represent a hysteresis margin on the UE side and $\delta_{UE}$ may represent an adjustment step on the UE side.

An efficiency calculation block 824 may average the spectral efficiency based on the downlink resource allocations received from the eNodeB to generate an average efficiency 822 used for downlink allocations. According to certain aspects, the efficiency may be signaled in PDCCH through an MCS index ($I_{MCS}$). From the MCS index, the UE may derive a Modulation Order ($Q_m$) and a TBS Index ($I_{TBS}$) based on the procedures described in 3GPP TS 36.213. The spectral efficiency may be defined as a number of allocated resource elements divided by transmit block size (TBS).

For certain aspects, the advertised CQI value 815 that is sent to the eNodeB may be the minimum between the value measured based on the channel quality 814 and the value determined by the flow control module. The advertised CQI values 815 may be averaged in block 816 to generate CQI_avg 820 which may be used for the purpose of HARQ error rate calculation in block 818.

Even though the FC_CQI may vary very slowly relative to a CQI report interval, the CQI reported to the eNodeB may be based on the actual channel measurements. As an example, this may occur when the measured_CQI is less than FC_CQI.

In order to calculate the expected efficiency, the average advertised CQI value 820 may be used by a HARQ NACK control block. The CQI average block 816 may calculate the average CQI 820 over all reported CQI values over a period $T_{CQI\_avg}$. According to aspects of the present disclosure, the period $T_{CQI\_avg}$ may be configurable with an initial value (e.g., 50 ms).

The HARQ process may operate with a modified NACK rate. For certain aspects, a UE may either drop the packets that are correctly received but for which a corresponding NACK is transmitted to the eNodeB, or send those packets to the higher layer even though their reception is not acknowledged yet.

Figure 11:
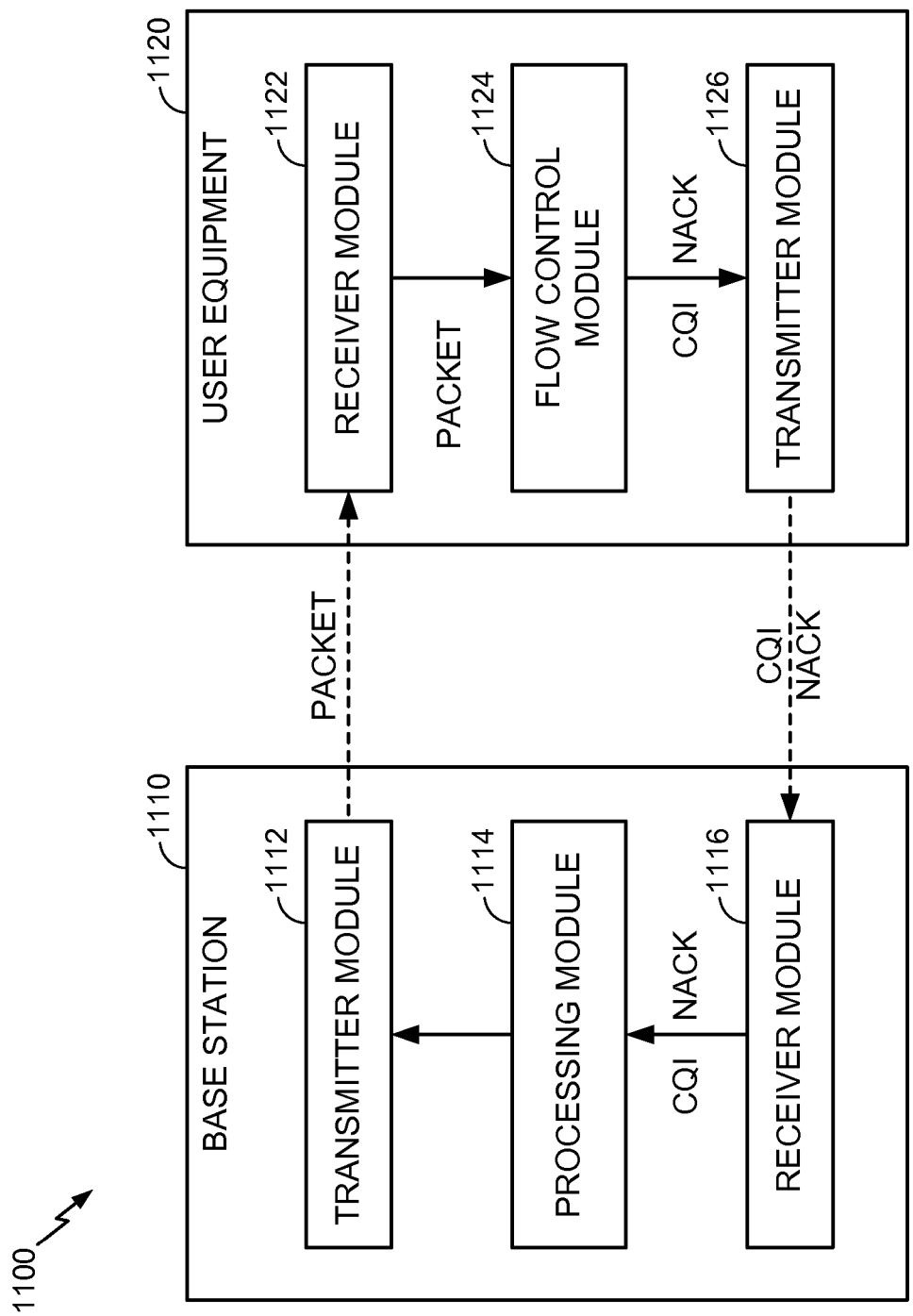
FIG. 11 illustrates an example communication system utilizing flow control, in accordance with certain aspects of the present disclosure.

FIG. 11 illustrates an example communication system 1100 utilizing downlink flow control, in accordance with certain aspects of the present disclosure. The communication system 1100 includes a base station (e.g., eNodeB) 1110 and a UE 1120. The base station includes a transmitter module 1112 for transmitting packets to the UE. The UE 1120 receives the packet with the receiver module 1122. In case an overload condition happens (e.g., CPU overloaded or nearly overloaded, memory overloaded or nearly overloaded and the like), the flow control module 1124 generates an advertised CQI and one or more NACK messages to simulate a degraded channel. The transmitter module 1126 transmits the CQI and NACK messages to the base station 1110. The base station receives the packets through receiver module 1116, analyzes the packets in the processing module 1114, and adjusts its transmission rate based on the received CQI and NACK messages to the new, degraded channel conditions.

Flow Control Via L1 Packet Dropping

Certain aspects of the present disclosure entail dropping a packet at the physical layer (e.g., layer 1 (L1)) in order to perform downlink flow control. For example, an entire HARQ packet may randomly be dropped based on a given probability. However, this method may waste network resources and may not allow any quality of service control. Therefore, high priority voice and signaling packets may be dropped in this method. For certain aspects, the RLC packets that belong to low priority connections may be dropped. Therefore, an interface from RLC to L1 that specifies priority of each packet may be desired. Similar to reducing the window size, dropping packets at L1 may waste network resources. In addition, the eNodeB may detect a high percentage of packet loss and may increase its transmission power, further wasting the network resources. For certain aspects, the eNodeB may be prevented from increasing its transmission power by sending an acknowledgment for the packets at the HARQ level even though they are dropped. In this case, if the packet belongs to an Unacknowledged Mode (UM) RLC channel, it may be lost, and if the packet belongs to an Acknowledged Mode (AM) RLC channel, it may be retransmitted at the RLC layer.

Figure 12:
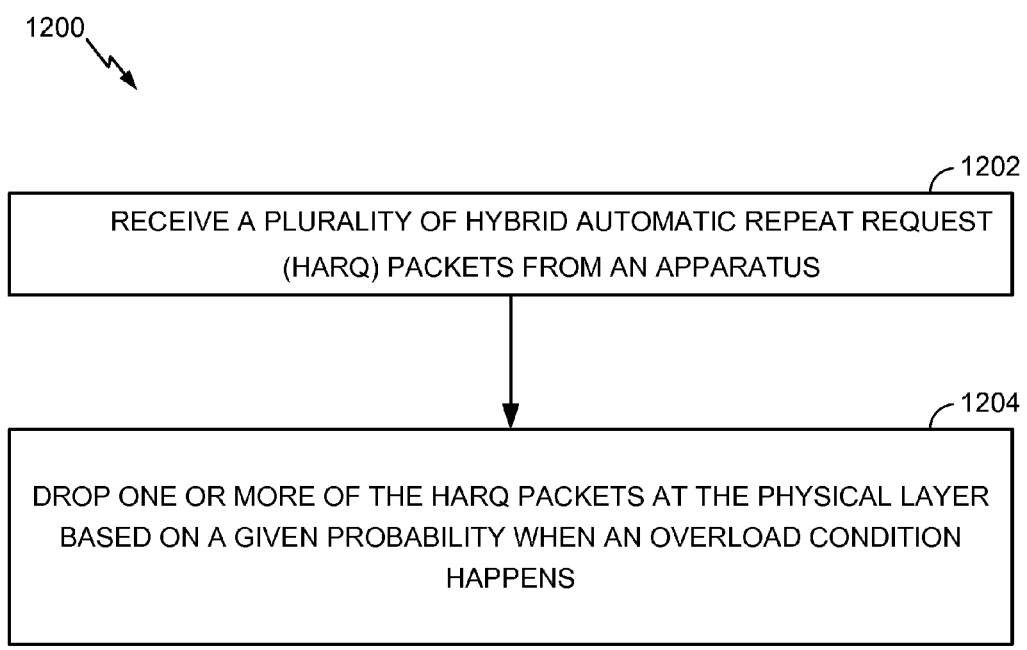
FIG. 12 illustrates example operations that may be performed by a UE for downlink flow control, in accordance with certain aspects of the present disclosure.

FIG. 12 illustrates example operations 1200 that may be performed by a UE for downlink flow control, in accordance with certain aspects of the present disclosure. At 1202, the UE receives a plurality of hybrid automatic repeat request (HARQ) packets from an apparatus. At 1204, the UE drops one or more of the HARQ packets at the physical layer based on a given probability when an overload condition happens. The overload condition may comprise CPU overload or near overload, memory overload or near overload and/or overheating or nearly overheating. Near overload may include being within a value from an overload threshold. Similarly, nearly overheating may include being within a value from an overheating threshold. For certain aspects, the dropped packets may be acknowledged even though they are dropped.

The various operations of methods described above may be performed by any suitable means capable of performing the corresponding functions. The means may include various hardware and/or software component(s) and/or module(s), including, but not limited to a circuit, an application specific integrated circuit (ASIC), or processor.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the phrase "at least one of A or B" is meant to include any combination of A and B. In other words, "at least one of A or B" comprises A or B or A and B.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The techniques provided herein may be utilized in a variety of applications. For certain aspects, the techniques presented herein may be incorporated in an access point station, an access terminal, a mobile handset, or other type of wireless device with processing logic and elements to perform the techniques provided herein.

While the foregoing is directed to aspects of the present disclosure, other and further aspects of the disclosure may be devised without departing from the basic scope thereof, and the scope thereof is determined by the claims that follow.

What is claimed is:

1. A method for wireless communications, comprising:
receiving a packet from an apparatus through a channel;
determining an advertised channel quality indicator (CQI) value indicating information regarding a degraded channel when an overload condition happens, wherein the advertised CQI value is determined based on at least one of an actual CQI of the channel, a target flow rate or channel bandwidth;
determining a modified acknowledgment message based at least on the advertised CQI and an actual acknowledgment message, wherein the actual acknowledgment message indicates whether or not the packet is received correctly, wherein determining the modified acknowledgment message comprises setting the modified acknowledgment message to a NACK (negative acknowledgment) based on a probability even if the actual acknowledgment message is set to an ACK (acknowledgment), wherein the probability is determined based on one or more of an average flow rate, the target flow rate and a hysteresis margin, and wherein the average flow rate corresponds to a hybrid automatic repeat request (HARQ) error rate during normal operation; and
transmitting the advertised CQI and the modified acknowledgment message to the apparatus to adjust flow rate of future transmissions.

2. The method of claim 1, wherein determining the advertised CQI comprises:
determining a flow control efficiency based on the target flow rate, the channel bandwidth and transmission time interval;
determining a flow control CQI by selecting a maximum CQI value that supports the flow control efficiency; and
determining the advertised CQI value by selecting a minimum between the flow control CQI and the CQI of the channel.

3. The method of claim 1, further comprising:
receiving a flow control command; and
determining at least one of the target flow rate or the advertised CQI based at least on the flow control command.

4. The method of claim 1, wherein the overload condition comprises one or more of processor overload, processor near-overload, memory overload, memory near-overload, overheating or near-overheating.

5. The method of claim 1, further comprising:
storing the packet in a buffer until a last re-transmission or until an ACK message for the packet is transmitted.

6. The method of claim 1, wherein determining the modified acknowledgment message based at least on the advertised CQI and the actual acknowledgment message comprises determining the modified acknowledgment message based at least on the advertised CQI, the actual CQI and the actual acknowledgment message.

7. An apparatus for wireless communications, comprising:
means for receiving a packet from a base station through a channel;
means for determining an advertised channel quality indicator (CQI) value indicating information regarding a degraded channel when an overload condition happens, wherein the advertised CQI value is determined based on at least one of an actual CQI of the channel, a target flow rate or channel bandwidth;
means for determining a modified acknowledgment message based at least on the advertised CQI and an actual acknowledgment message, wherein the actual acknowledgment message indicates whether or not the packet is received correctly, wherein the means for determining the modified acknowledgment message comprises means for setting the modified acknowledgment message to a NACK (negative acknowledgment) based on a probability even if the actual acknowledgment message is set to an ACK (acknowledgment), wherein the probability is determined based on one or more of an average flow rate, the target flow rate and a hysteresis margin, and wherein the average flow rate corresponds to a hybrid automatic repeat request (HARQ) error rate during normal operation; and
means for transmitting the advertised CQI and the modified acknowledgment message to the base station to adjust flow rate of future transmissions.

8. The apparatus of claim 7, wherein the means for determining the advertised CQI comprises:
means for determining a flow control efficiency based on the target flow rate, the channel bandwidth and transmission time interval;
means for determining a flow control CQI by selecting a maximum CQI value that supports the flow control efficiency; and
means for determining the advertised CQI value by selecting a minimum between the flow control CQI and the CQI of the channel.

9. The apparatus of claim 7, further comprising:
means for receiving a flow control command; and
means for determining at least one of the target flow rate or the advertised CQI based at least on the flow control command.

10. The apparatus of claim 7, wherein the overload condition comprises one or more of processor overload, processor near-overload, memory overload, memory near-overload, overheating or near-overheating.

11. The apparatus of claim 7, further comprising:
means for storing the packet in a buffer until a last retransmission or until an ACK message for the packet is transmitted.

12. The apparatus of claim 7, wherein the means for determining the modified acknowledgment message based at least on the advertised CQI and the actual acknowledgment message comprises:
means for determining the modified acknowledgment message based at least on the advertised CQI, the actual CQI and the actual acknowledgment message.

13. A computer-program product for wireless communications, comprising a non-transitory computer readable medium having instructions stored thereon, the instructions being executable by one or more processors and the instructions comprising:
instructions for receiving a packet from an apparatus through a channel;
instructions for determining an advertised channel quality indicator (CQI) value indicating information regarding a degraded channel when an overload condition happens, wherein the advertised CQI value is determined based on at least one of an actual CQI of the channel, a target flow rate or channel bandwidth, wherein the instructions for determining the modified acknowledgment message comprise setting the modified acknowledgment message to a NACK (negative acknowledgment) based on a probability even if the actual acknowledgment message is set to an ACK (acknowledgment), wherein the probability is determined based on one or more of an average flow rate, the target flow rate and a hysteresis margin, and wherein the average flow rate corresponds to a hybrid automatic repeat request (HARQ) error rate during normal operation;
instructions for determining a modified acknowledgment message based at least on the advertised CQI and an actual acknowledgment message, wherein the actual acknowledgment message indicates whether or not the packet is received correctly; and
instructions for transmitting the advertised CQI and the modified acknowledgment message to the apparatus to adjust flow rate of future transmissions.

14. An apparatus for wireless communications, comprising: at least one processor configured to:
receive a packet from a base station through a channel;
determine an advertised channel quality indicator (CQI) value indicating information regarding a degraded channel when an overload condition happens, wherein the advertised CQI value is determined based on at least one of an actual CQI of the channel, a target flow rate or channel bandwidth;
determine a modified acknowledgment message based at least on the advertised CQI and an actual acknowledgment message, wherein the actual acknowledgment message indicates whether or not the packet is received correctly, wherein determining the modified acknowledgment message comprises setting the modified acknowledgment message to a NACK (negative acknowledgment) based on a probability even if the actual acknowledgment message is set to an ACK (acknowledgment), wherein the probability is determined based on one or more of an average flow rate, the target flow rate and a hysteresis margin, and wherein the average flow rate corresponds to a hybrid automatic repeat request (HARQ) error rate during normal operation; and
transmit the advertised CQI and the modified acknowledgment message to the base station to adjust flow rate of future transmissions; and
a memory coupled to the at least one processor.

* * * * *